United States Patent [19]

Schlanger

[11] 4,363,385
[45] Dec. 14, 1982

[54] TRANSMISSION BRAKE BAND END CONNECTION

[76] Inventor: Alfred Schlanger, 265 Wheatley Rd., Old Westbury, N.Y. 11729

[21] Appl. No.: 232,489

[22] Filed: Feb. 9, 1981

Related U.S. Application Data

[63] Continuation-in-part of Ser. No. 173,228, Jul. 28, 1980, abandoned.

[51] Int. Cl.³ ..................... F16D 65/04; F16D 65/06
[52] U.S. Cl. .................................. 188/249; 188/259; 192/107 T; 29/401.1
[58] Field of Search ........... 192/79, 80, 107 T, 107 R, 192/17 R; 188/77 W, 77 R, 249, 259, 250, 26, 58; 228/170, 231; 29/402.06, 402.11, 402.14, 402.15, 401.1

[56] References Cited

U.S. PATENT DOCUMENTS 3,732,954  5/1973  Heid ................................. 188/259
3,747,713  7/1973  Victory ............................. 188/259
3,842,952  10/1974  Cook, Jr. ....................... 188/259 X

*Primary Examiner*—Douglas C. Butler
*Attorney, Agent, or Firm*—Stephen E. Feldman; Marvin Feldman; Jules L. Chaboty

[57] ABSTRACT

An end connection for a replacement transmission brake band enables the band to be inserted longitudinally into the space between transmission drum and housing. The end connection comprises a removable bracket which is made part of the modified replacement transmission brake band. The bracket is placed on the modified transmission brake band after insertion of the modified transmission brake band into the space between transmission housing and brake drum. The bracket replaces the former permanently mounted end connection of the modified transmission brake band. The invention includes a method for converting a conventional end connection to the replaceable end construction of the present invention.

11 Claims, 8 Drawing Figures

TRANSMISSION BRAKE BAND END CONNECTION

CROSS REFERENCED RELATED APPLICATIONS

This application is a continuation-in-part of U.S. Ser. No. 173,228, filed July 28, 1980 and now abandoned.

FIELD OF THE INVENTION

The invention relates to brake bands for automatic transmissions.

BACKGROUND OF THE INVENTION

Automatic transmission bands are fabricated of a flexible and resilient metal strap with friction material bonded on one side thereto, and the band is disposed in the narrow gap between the transmission housing and ring gear drum. Should a brake band break or have slippage problems, a replacement band must ordinarily be installed by first removing and disassembling the transmission, a very costly procedure. The industry was desirous of providing a brake band which eliminated the transmission removal and disassembly.

DESCRIPTION OF PRIOR ART

Attempts to modify such brake bands for the purpose of avoiding disassembly are disclosed in a series issued to T. J. Victory, namely, U.S. Pat. Nos. 3,747,713; 3,785,042; 3,858,691; 3,869,785 and 3,926,359. The aforementioned patents are directed to a series of brake band end connections which are for replacement use in automatic transmissions, and which generally involve restructuring one end of the brake band to provide a slip fit into the annular gap between the transmission housing and the ring gear drum.

In the patent issued to Heid, U.S. Pat. No. 3,732,954, there is disclosed the use of a replaceable bracket which is specially designed to fit one end of a brake band.

The approach disclosed in the Victory patents often necessitated cumbersome rebending of metal elements to conform to the desired end configuration, whereas the approach taken by Heid did not fully meet the needs for ready and inexpensive modifications of existing brake bands to a band with a readily replaceable bracket which is readily manufactured and adapted for use from a conventional brake band.

BRIEF SUMMARY OF THE INVENTION

It is an object of the present invention to provide a novel and improved brake band end connection, and method of modifying a conventional brake band to the brake band of the present invention.

Another object of the present invention is to provide an end connection which is readily installed.

A further object of the present invention is to provide an end connection which may be readily applied to a modified brake band.

A still further object of the present invention is to enable simple modification of a standard brake band to the brake band end construction of the present invention.

DESCRIPTION OF THE PREFERRED EMBODIMENTS

Figure 1:
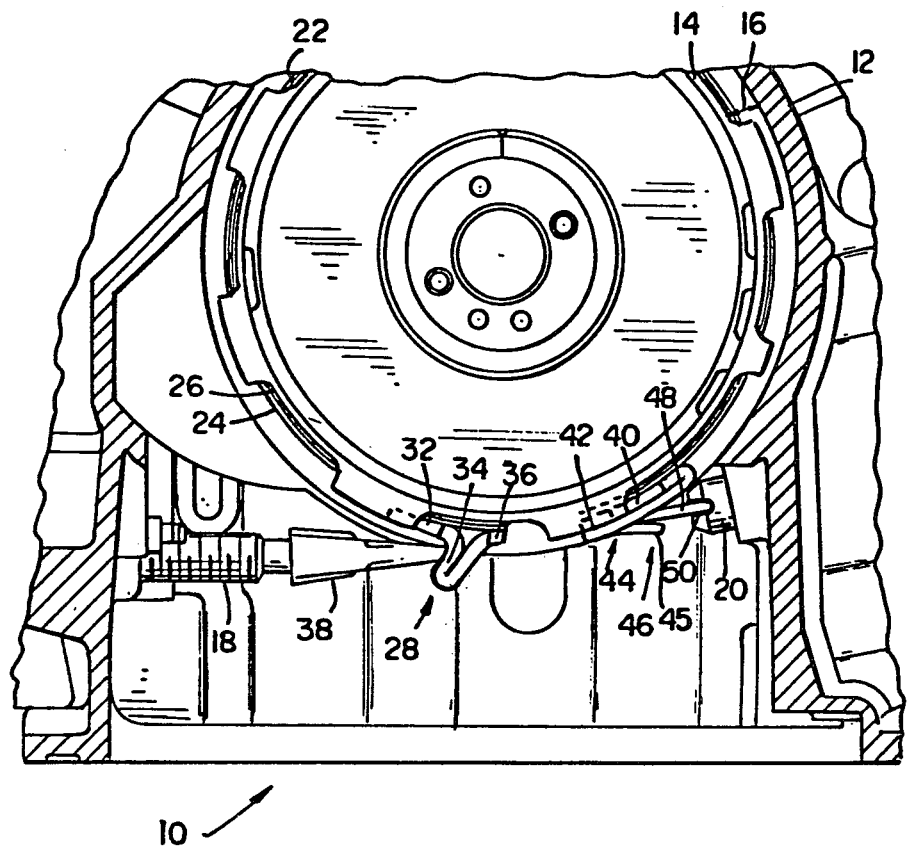
FIG. 1 is a fragmentary cross-sectional view in elevation of a transmission housing showing the brake band described in the present invention.

An automatic transmission is generally indicated at 10 in FIG. 1 and has a circular housing 12 surrounding a brake drum 14 which is part of the ring gear of the planetary gear system. The radial gap between the drum 14 and housing 12 is indicated by a double-ended arrow 16 in FIG. 1. The housing 12 contains an adjustable backup screw 18 and a piston rod 20 on opposite sides thereof for engagement with a brake band, generally indicated 22.

The brake band 22 comprises a flexible resilient metal portion 24 having a friction lining 26 bonded thereto. Band 22 is provided at its first end with a generally indicated first end connection 28. First end connection generally designated 28 is a standard brake band end connection having a curved rear portion 32 an intermediate reverse fold 34 and a curved front portion 36. Rear portion 32 and front portion 36 are spot welded to the first end of flexible metal portion 24. Intermediate reverse fold 34 serves as a seat for a strut 38. It can easily be seen that the radial dimensions of first end connection 28 is greater than radial gap 16.

In order to allow flexible metal portion 24 and associated components to fit into radial gap 16 the standard end connection found at the second end of flexible metal portion 24 which is similar to first end connection 28 is modified in accordance with the invention by removing intermediate reverse fold 34 from the standard end connection. This modification removes fold 34 so that its remaining structure is flush with a curved rear portion 40 and a curved front portion 42 to which bracket 44 is affixed. A modified end connection generally designated 46 is found at the second end of flexible metal portion 24 consisting of bracket 44 having a bent portion 45 which receives a strut 48 at its other end, strut 48 is received by a slot 50 in piston rod 20.

Figure 2:
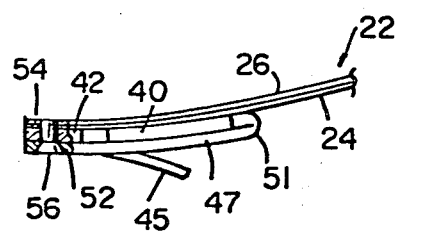
FIG. 2 is a fragmentary cross-sectional view in elevation of a first embodiment of the present invention.

FIG. 2 is a first embodiment of end connection 46 showing brake band 22 with its components, resilient metal portion 24 and friction lining 26. Attached to resilient portion 24 is curved rear portion 40 and curved front portion 42 both being part of the original end connection similar to first end connection 28 (best seen in FIG. 1) before modification. A first bracket 47 has a reverse bend 51 at its most rearward portion and has bent portion 45 for receiving strut 48 (best seen in FIG. 1). First bracket 47 has provided a countersunk hole 52 which is aligned with a tapped hole 54 provided in curved front portion 42 of brake band 22. A socket head set screw 56 passes through countersunk hole 52 and screws into tapped hole 54. When socket head set screw 56 is fully bottomed, as shown in FIG. 2, it fastens first bracket 47 to brake band 22 thereby maintaining the proper relationship between the two. First bracket 47 may be provided with a pair of outboard tabs (not shown) which can be used for lateral location purposes.

Figure 3:
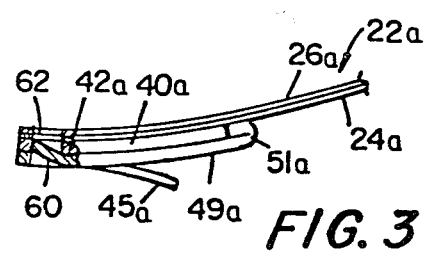
FIG. 3 is a fragmentary cross-sectional view in elevation of a second embodiment of the present invention.

Attention to FIG. 3 will show a second embodiment of end connection 46a. Here will be seen a second bracket 49a. Brake band 22a, rear portion 40a, front portion 42a and reverse bend 51a have all hereinbefore been described in connection with FIG. 2. Second bracket 49a, however, is provided with a punched tab 60, being formed front part of second bracket 49, which tab enters an elongated slot 62, which has been provided in front portion 42a of brake band 22a. Punched tab 60 serves to laterally and longitudinally locate bracket 49 on brake band 22a.

Figure 4:
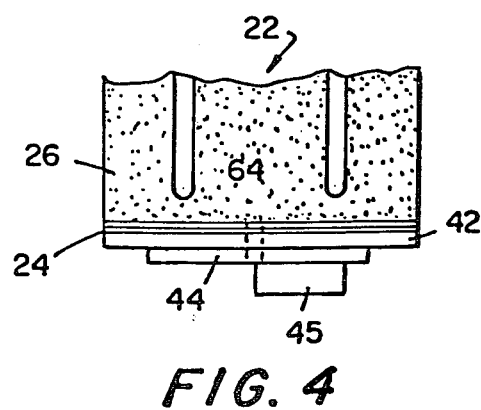
FIG. 4 is a fragmentary end view of the brake band of FIG. 2; described by the present invention.

FIG. 4 shows an end view of brake band 22 where it can be seen that the bracket 44 is centered relative to brake band 22. Further, the position of tapped hole 54 or slot 62 is generally designated by a location 64 on FIG. 4. The offset position of bent portion 45 is also seen.

When it is desired to replace a transmission brake band with one of the present invention the old brake band is removed by cutting off an existing end connection with metal shears. After removing the old brake band a new brake band is prepared by removing or shaving off intermediate reverse fold 34 from its second end. This operation leaves a smooth curved rear portion 40 and curved front portion 42 attached to brake band 22. Brake band 22 is further modified in accordance with this invention by providing tapped hole 54 or slot 62 therein so that either first bracket 47 or second bracket 49 may respectively be used. Regardless of which embodiment is provided, the modified second end of brake band 22 is slipped into radial gap 16 and slowly fed into gap 16 until the second end of brake band 22 appears in the general area of piston rod 20. Prior to the removal of the old brake band adjustable backup screw 18 is retracted resulting in attached strut 38 changing position. Movement of strut 38 provides clearance for first end connection 28 to move into circular housing 12 thereby enabling second end of brake band 22 to have the clearance required to assemble modified end connection 46.

If first bracket 47 is to be attached brake band 22 has been previously provided with tapped hole 54 at its second end. The lower portion of reverse bend 51 is abutted the rear edge of curved rear portion 40 and set screw 56 is threaded into tapped hole 54 thus fastening first bracket 47 to brake band 22. Brake band 22 is now positioned in automatic transmission 10 so that strut 48 contacts the pocket formed by bracket 47 and bent portion 45. Adjustable backup screw 18 is now advanced until attached strut 38 contacts the pocket formed by curved rear portion 32 and intermediate reverse fold 34, both part of first end connection 28. When adjustable backup screw 18 is properly adjusted any movement of piston rod 20 is transmitted to strut 48 which then transmits the movement to bracket 47 thereby causing brake band 22 to engage brake drum 14. Construction of bracket 47 ensures that the force of strut 48 is transmitted to brake band 22 through lock screw 56 and reverse bend 51 thereby providing adequate force transmitting capacity.

If second bracket 49a is to be attached, brake band 22a is provided with a slotted hole 62a which will receive punched tab 60. Second bracket 49a is useful if a lock screw 56 (FIG. 2) is to be dispensed with making this embodiment faster to assemble. The preparation for brake band 22a replacement is the same as aforedescribed. During the placement of second bracket 49a it will be necessary for a force to be applied in the same direction as that provided by adjustable backup screw 18 until screw 18 can be positioned to retain brake band 22a. With screw 18 properly adjusted the resiliency of brake band 22a will cause it to uncoil. This tendency to uncoil will cause the second end of brake band 22a to maintain contact with second bracket 49a and for second bracket 49a to contact strut 48. The placement of bent portion 45a, punched tab 60 and reverse bend 51a ensures that the force provided by strut 48 during braking operation will be properly and efficiently transmitted to brake band 22a.

Figure 5:
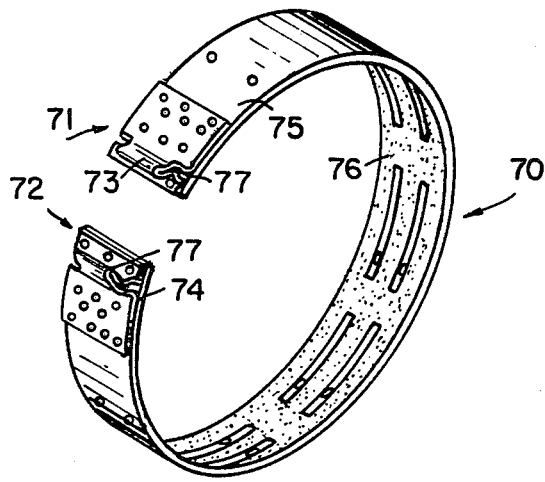
FIG. 5 is a perspective view of a conventional brake band.

Referring to FIG. 5 there is shown a conventional transmission brake band 70 formed with opposed ends 71 and 72, each end having a strut seat 73 bonded thereto, and wherein each strut seat is formed of a base plate 74 bonded to the band surface 75 opposite the friction lining surface 76. Each base plate is integrally formed with a hooked portion 77 which receives a force-exerting strut (such as 38 in FIGS. 1 and 8).

Figure 6:
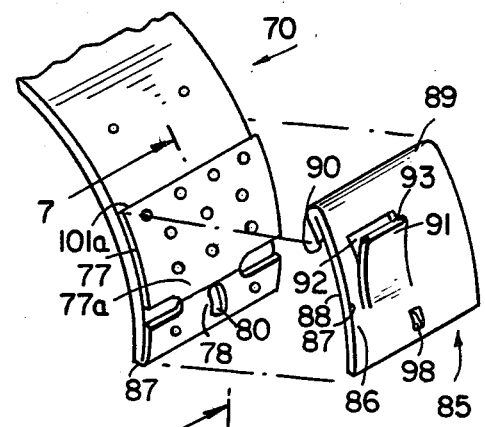
FIG. 6 is an enlarged perspective and exploded view of one end of the band of FIG. 5 showing modification of the band end pursuant to the present invention with another embodiment of the replacement bracket in place.
Figure 7:
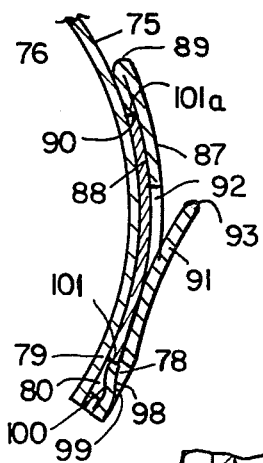
FIG. 7 is a sectional view taken along line 7—7 of FIG. 6.

In FIGS. 6–7 there is shown the band 70 with one of the hooked portions machine removed or shaved so as to provide a smooth curved outer surface 77a. An elongated hole 80 is punched or drilled through plate 77 as at 78, and through band 70 as at 79, immediately adjacent end 81 of band 70. Hole 80 is elongated in shape for purposes hereinafter appearing.

Figure 8:
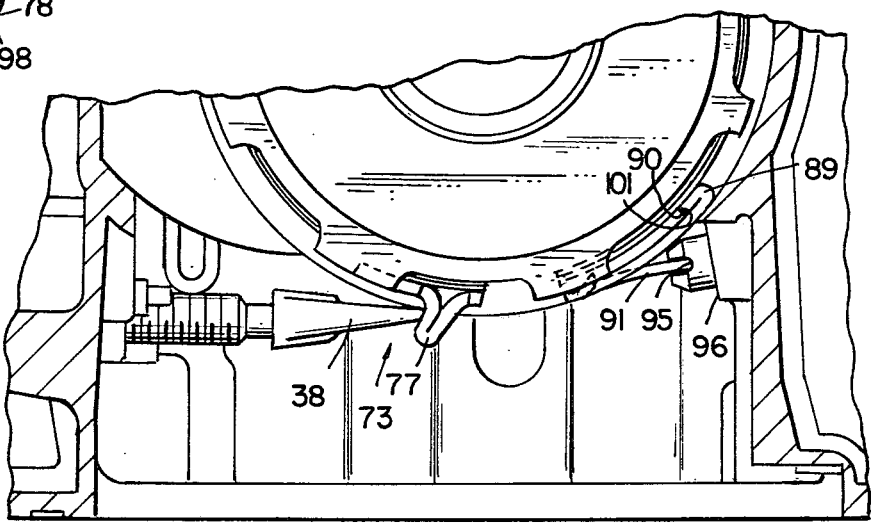
FIG. 8 is a partial fragmentary elevational view of the embodiment of FIGS. 6 and 7 installed on a transmission housing.

A replaceable bracket 85 is formed with a curved body portion 86 having upper curved surface 87 and lower curved surface 88, and being formed with a reverse bent portion 89 having load transmitting edge 90. Bracket 85 is also formed with a bent up portion or tongue 91, forming an opening 92 in the bracket body portion 86. Tongue 91 is formed with a rounded edge 93, and is formed so as to receive the female mount 95 of a conventional piston rod 96 (best shown in FIG. 8). Bracket body portion 86 is also formed with a partially pressed out tab 98 which depends from lower curved surface 88. Tab 98 is elongated as at 99 as is shaped by angled surfaces 100 and 101, with surface 100 being longer than and more acute than surface 101. In FIG. 8, the force-exerting piston rod 96 engages tongue 91 so as to exert an increase in force thereon, which force is transmitted through review head 89 to transmitting edge 90 and force receiving edge 101a and in turn to the barrel itself.

The tab location in juxtaposition to the tongue, and the angled tab design permits a high degree of force to be exerted on the bracket without having the bracket raise up or jump out of the mounting hole. This eliminates the need for screw fixed mounting.

The automatic transmission brake band of the present invention is particularly suited to the smaller transmissions of today's compact automobiles.

The embodiments of the invention particularly disclosed and described hereinabove are presented merely as examples of the invention; other embodiments, forms and modifications of the invention coming within the proper scope and spirit of the appended claims will of course, readily suggest themselves to those skilled in the art.

What is claimed is:

1. A transmission brake band comprising:
   a brake band formed with a friction lining on one side;
   a strut seat disposed on the other side of the band, and at one end of the band, and comprising a first base plate fixed to the one end, said first base plate being formed with a hooked portion extending from the first base plate; said band being formed with a hole adjacent the other end of the band;
   a second base plate formed on the other end and being formed with a hole coincident with said band hole, said second base plate being formed with a rear edge disposed away from said hole; and
   a replaceable bracket being formed with a bent portion forming a tongue and extending away from the bracket so as to form an opening in the bracket so that a force exerting member engages the tongue, said bracket being formed with mounting means receivable in said coincident hole, said mounting means comprising an elongated tab member depending from said bracket, said elongated tab member engaging said coincident hole, said hole being elongated so as to receive said tab, and said replaceable bracket being formed with a curved portion having an edge formed on the end of the bracket opposite from the hole, wherein said curved portion edge engages the rear edge of the second baseplate opposite the hole, whereby the force from said force exerting member is transferred from the tongue and curved portion to the second base plate and in turn to the band.

2. The transmission brake band of claim 1, said coincident hole being disposed immediately adjacent the end of the brake band.

3. The transmission brake band of claim 1, said elongated tab member being punched from said bracket, and said hole being elongated so as to receive said tab.

4. The transmission brake band of claim 1, said tab being formed as an angled portion and one side of the angle greater than the other, with the greater angled side disposed adjacent the end of the brake band.

5. The transmission brake band of claim 1, wherein said elongated tab member lies in a center line on said bracket and said tongue is disposed more to one side of said center line than the other.

6. The transmission brake band of claim 1, wherein the tongue is formed with a rounded edge to receive a female part of a force exerting member.

7. The transmission brake band of claim 1, wherein said elongated tab member is a partially punched tab formed from said bracket whereby no through hole is formed in the punch tab portion.

8. A method for modifying a transmission brake band comprising:
   providing a brake band being formed with strut seats bonded at opposite ends of said band, each seat being formed with a base plate fixed to the band, and a hooked portion formed on the plate;
   removing one of said hooked portions so as to form a mounting surface on one of said base plates;
   forming a hole in said one base plate and in the band, said hole being disposed adjacent one end of the band;
   mounting a replaceable bracket on said one base plate by mounting means formed on said bracket, said mounting means being receivable in said hole and comprising an elongated tab member depending from said bracket, said elongated tab member engaging said hole, said hole being elongated so as to receive said tab, said bracket being formed with bent portion forming a tongue extending away from the bracket so as to form an opening in the bracket so that a force exerting member engages the tongue, said bracket also being formed with a reverse bent portion at the end opposite the mounting means, said bent portion being formed with an edge which abuts the edge of the base plate opposite the hole, whereby the force exerting member engages the tongue to exert force on the bracket with the force transmitted from the reversed curved portion to the base plate and in turn to the band.

9. The method of claim 8, wherein the hooked portion is removed by machine shaving.

10. The method of claim 8, wherein forming the hole comprises punching a hole through the base plate and band.

11. The method of claim 8, wherein forming the tab comprises punching the tab from the bracket.

* * * * *